US 6,711,596 B1

(12) United States Patent
Coleman

(10) Patent No.: US 6,711,596 B1
(45) Date of Patent: Mar. 23, 2004

(54) METHOD AND APPARATUS FOR DETERMINING THE APPROXIMATE VALVE OF A LOGARITHMIC FUNCTION

(75) Inventor: John Nicholas Coleman, Newcastle Upon Tyne (GB)

(73) Assignee: University of Newcastle Upon Tyne (GB)

( * ) Notice: Subject to any disclaimer, the term of this patent is extended or adjusted under 35 U.S.C. 154(b) by 0 days.

(21) Appl. No.: 09/700,353

(22) PCT Filed: May 14, 1999

(86) PCT No.: PCT/GB99/10359

§ 371 (c)(1),
(2), (4) Date: Nov. 13, 2000

(87) PCT Pub. No.: WO99/59050

PCT Pub. Date: Nov. 18, 1999

(51) Int. Cl.⁷ .............................................. G06F 7/556
(52) U.S. Cl. ...................................................... 708/277
(58) Field of Search .............................. 708/277, 512, 708/517

(56) References Cited

U.S. PATENT DOCUMENTS

| | | | | |
|---|---|---|---|---|
| 5,337,266 A | * | 8/1994 | Arnold | 708/517 |
| 5,675,822 A | * | 10/1997 | Kelley | 712/35 |
| 6,289,367 B1 | * | 9/2001 | Allred | 708/277 |

FOREIGN PATENT DOCUMENTS

GB    PCT/GB99/01359    8/1999

OTHER PUBLICATIONS

Coleman, J.N., "Simplification of table structure in logarithmic arithmetic," *Electronics Letters*, 1995, vol. 31, No. 22, pp. 1905–1906.

Ohhashi, M. et al., "High–speed computation of unary functions," *Proceedings of 7th Symposium on Computer Arithmetic*(Cat. No. 85CH2146–9), 1985, pp. 82–85.

* cited by examiner

*Primary Examiner*—David H. Malzahn
(74) *Attorney, Agent, or Firm*—Daniel B. Schein, Esq.

(57) ABSTRACT

A logarithmic arithmetic apparatus for enabling a microprocessor to determine the approximate value of a logarithmic function F(x) at a value of x of interest is disclosed. The apparatus includes look up tables (104 to 107) for storing and simultaneously accessing values of the function and its derivative for discrete values of x, an error between the value of the function and the value extrapolated from the derivative for discrete values of x, and a ratio function for determining the proportion of this error across an interval between two adjacent discrete values of x. The apparatus is also provided with multipliers (108, 109) and adder stages (110 to 112). The apparatus enables many logarithmic arithmetic functions to be determined accurately without significantly increasing the necessary capacity of the look up tables (104 and 105), and without significantly decreasing the speed of calculation.

20 Claims, 3 Drawing Sheets

METHOD AND APPARATUS FOR DETERMINING THE APPROXIMATE VALVE OF A LOGARITHMIC FUNCTION

The present invention relates to a logarithmic calculating apparatus and method, and relates particularly, but not exclusively, to a logarithmic calculating apparatus and method to be incorporated within microprocessors.

In electronic computational machines, it is known to represent real numbers upon which the machines operate using the "floating point" system, which will be familiar to persons skilled in the art. Using the "floating point" system, add, subtract and multiply operations can be exercised at reasonable speed. However, this system suffers from the drawback that divide operations take place much more slowly, and all operations are subject to a maximum rounding error of half of a least significant bit.

An alternative known approach is to represent real numbers as fixed-point logarithms, this approach generally being referred to as a Logarithmic Number System (LNS). Using such a system, multiplication and division operations may be implemented very rapidly and with no error, but this is at the expense of considerable complexity, latency and lack of accuracy in the addition and subtraction processes.

The operation of a conventional Logarithmic Number System, such as in existing arithmetic devices, is shown schematically in FIG. 1, in which addition and subtraction operations require the evaluation of:

$$\log_2(2^i+2^j)=i+\log_2(1+2^{j-i});$$

$$\log_2(2^i-2^j)=i+\log_2(1-2^{j-i});$$

where j is less than or equal to i.

The logarithmic function $F(r=(j-i))=\log_2(1+2^{j-i})$ for the add operation is shown in FIG. 2. The device shown in FIG. 1 is provided with look up tables which store the value of the function F(r) for a range of discrete values of r. For practical applications, it is not possible to store the function for all values of r, as this would require a look up table of impracticable size, and so the value of the function is therefore stored at intervals of width $\Delta$. To further minimise the storage requirements, $\Delta$ is progressively increased as the function becomes more linear with decreasing r, and an intervening value of r lying in the nth interval is thus expressed as:

$$r=-\delta\{n=O\};\ r=\Sigma(-\Delta_n)-\delta\{n>0\}$$

For clarity, however, this description omits any further reference to the variation in $\Delta$, and the expression may be abbreviated to $r=-n\Delta-\delta$.

Alongside each value of the function F(r) is stored its derivative, or slope at that point, D(r). The function for any intermediate value of r is then obtained by interpolation with a first-order Taylor-series:

$$F(-n\Delta-\delta)=F(-n\Delta)-\delta D(-n\Delta)$$

FIG. 3 shows in detail the function F(r) within one interval of width $\Delta$. The error $\epsilon$ between the true value of the Function F(r) at position $\delta$ and that interpolated from the derivative at an adjacent stored position is shown. Referring to FIG. 1, the apparatus has a selector/subtracter 1 for deriving the values of i and r=j−i, a look up table 2 containing the value of the function F(r) at discrete values of r, and a look up table 3 containing values of the derivative D(r) at discrete values of r. A multiply stage 4 multiplies the derivative D(r) by $\delta$ and a carry-save-add stage 5 adds together the outputs of the selector/subtracter 1, look up table 2 and multiplier 4. The output of the carry-save-add stage 5 is then fed to a carry-propagate-add stage 6.

It can therefore be seen that following the initial subtraction in selector/subtracter 1 to obtain r, r is partitioned into lower and higher order segments, so effectively dividing by $\Delta$. The higher order segment represents n and is used to access the function F(r) in look up table 2 and derivative D(r) in look up table 3, whilst the lower order segment represents $\delta$. F(−n$\Delta$) stored in look up table 2 is then added in the carry-save-add stage 5 to the product $\delta$.D(−n$\Delta$) obtained from the multiplier 4, so as to obtain the approximation to F(r) at the value of r of interest, to which is also added i, the addition being completed in the final carry-propagate-add stage 6, so as to yield the result.

As can be seen from FIG. 3, the prior art arrangement described with reference to FIGS. 1 to 3 includes an interpolation error:

$$\epsilon(n,\delta)=F(-n\Delta)-\delta.D(-n\Delta)-F(-n\Delta-\delta)$$

and for each n, $\epsilon$ increases with $\delta$ to a maximum:

$$E(n)=F(-n\Delta)-\Delta.D(-n\Delta)-F(-n\Delta-\Delta)\ \text{approximately.}$$

In any practical implementation, the error $\epsilon$ must be minimised to an acceptable magnitude. This can be achieved by decreasing the increment $\Delta$, but at the cost of a considerable increase in the required capacity of the look up tables. Alternatively, methods are known which apply correction algorithms to minimise the error without increasing the necessary capacity of the look up tables. However, these all suffer from the drawback that they involve many extra stages in the computation process, which are executed serially, and therefore introduce speed limitations.

Preferred embodiments of the present invention seek to overcome the above disadvantages of the prior art.

According to an aspect of the present invention, there is provided a logarithmic calculating apparatus for determining the approximate value of a logarithmic function F(x) at a value of x of interest, the apparatus comprising:

first memory means for storing values of the function F(x) for a plurality of discrete values of x;

second memory means for storing values of F'(x), the slope of the function F(x), for said plurality of discrete values of x;

first multiplier means, or equivalent thereof, for multiplying the value of F'(x) for a said discrete value of x adjacent to the value of x of interest by $\delta$, the difference between said adjacent discrete value of x and the value of x of interest;

third memory means for storing values of E (x), the approximate difference between [F(x)+$\Delta$.F'(x)] and F(x+$\Delta$) where x and x+$\Delta$ are the adjacent pair of said discrete values of x nearest to the value of x of interest;

fourth memory means for storing values of P($\delta$), the ratio of (i) the difference between F(x+$\delta$) and [F(x)+$\delta$.F'(x)], to (ii) E(x) for a plurality of values of $\delta$;

second multiplier means, or equivalent thereof, for multiplying together the outputs of said third and fourth memory means; and adder means for adding together the outputs of said first memory means, said first multiplier means and said second multiplier means to produce an output representing the approximate value of F(x) at the value of x of interest.

The present invention is based on the surprising observation that for many logarithmic functions, the ratio function $P(\delta)$ for a given value of $\delta$ is almost, although not exactly, constant for all values of n. This provides the advantage that it is possible to store for a single value of n a look up table containing the values of $P(\delta)$ at successive points throughout an interval of width $\Delta$. This in turn provides the advantage of enabling the logarithmic function $F(x)$ to be calculated accurately for a value of x of interest without significantly increasing the necessary size of look up tables in the apparatus, and without significantly decreasing the speed of calculation. For example, the necessary size of look up tables may be doubled compared with the prior art, which does not cause significant problems. It will also be appreciated by persons skilled in the art that the quantities x, $F(x)$, $F'(x)$, $\delta$, $E(x)$ and $\Delta$ defined above can be positive or negative.

In a preferred embodiment, said first and second multiplier means operate substantially simultaneously in use.

This provides the advantage of not decreasing the speed at which the calculation process can be carried out.

The apparatus may further comprise further adder means.

The or each adder means may be a carry-save-add means cooperating with at least one carry-propagate add means.

This provides the advantage of minimising the extent to which further adder stages slow down the calculation process.

In a preferred embodiment, said first, second, third and fourth memory means are accessed substantially simultaneously in use.

This provides the advantage of not decreasing the speed of the calculation process.

According to another aspect of the invention, there is provided a microprocessor including a logarithmic calculating apparatus as defined above.

According to a further aspect of the present invention, there is provided a method of determining the approximate value of a logarithmic function $F(x)$ at a value of x of interest in a logarithmic calculating apparatus, the method comprising the steps of:

storing values of the function $F(x)$ for a plurality of discrete values of x;

storing values of $F'(x)$, the slope of the function $F(x)$, for said plurality of discrete values of x;

multiplying the value of $F'(x)$ for a said discrete value of x adjacent to the value of x of interest by $\delta$, the difference between said adjacent discrete value of x and the value of x of interest;

storing values of $E(x)$, the approximate difference between $[F(x)+\Delta.F'(x)]$ and $F(x+\Delta)$ where x and $x+\Delta$ are the adjacent pair of said discrete values of x nearest to the value of x of interest;

storing values of $P(\delta)$, the ratio of (i) the difference between $[F(x)+\delta.F'(x)]$ and $F(x+\delta)$, to (ii) $E(x)$ for a plurality of values of $\delta$;

multiplying together the values of $E(x)$ and $P(\delta)$ for the value of x of interest; and adding together said values of $F(x)$, $\delta.F'(x)$ and $E(x).P(\delta)$ to provide the approximate value of $F(x)$ for the value of x of interest.

In a preferred embodiment, said multiplication steps are carried out substantially simultaneously.

Said addition step may be carried out by means of a carry-save-add stage cooperating with a subsequent carry-propagate-add stage.

The stored values are preferably accessed substantially simultaneously.

This provides the advantage of not decreasing the speed of the calculation process.

A preferred embodiment of the invention will now be described, by way of example only and not in any limitative sense, with reference to the accompanying drawings, in which.

Figure 1:
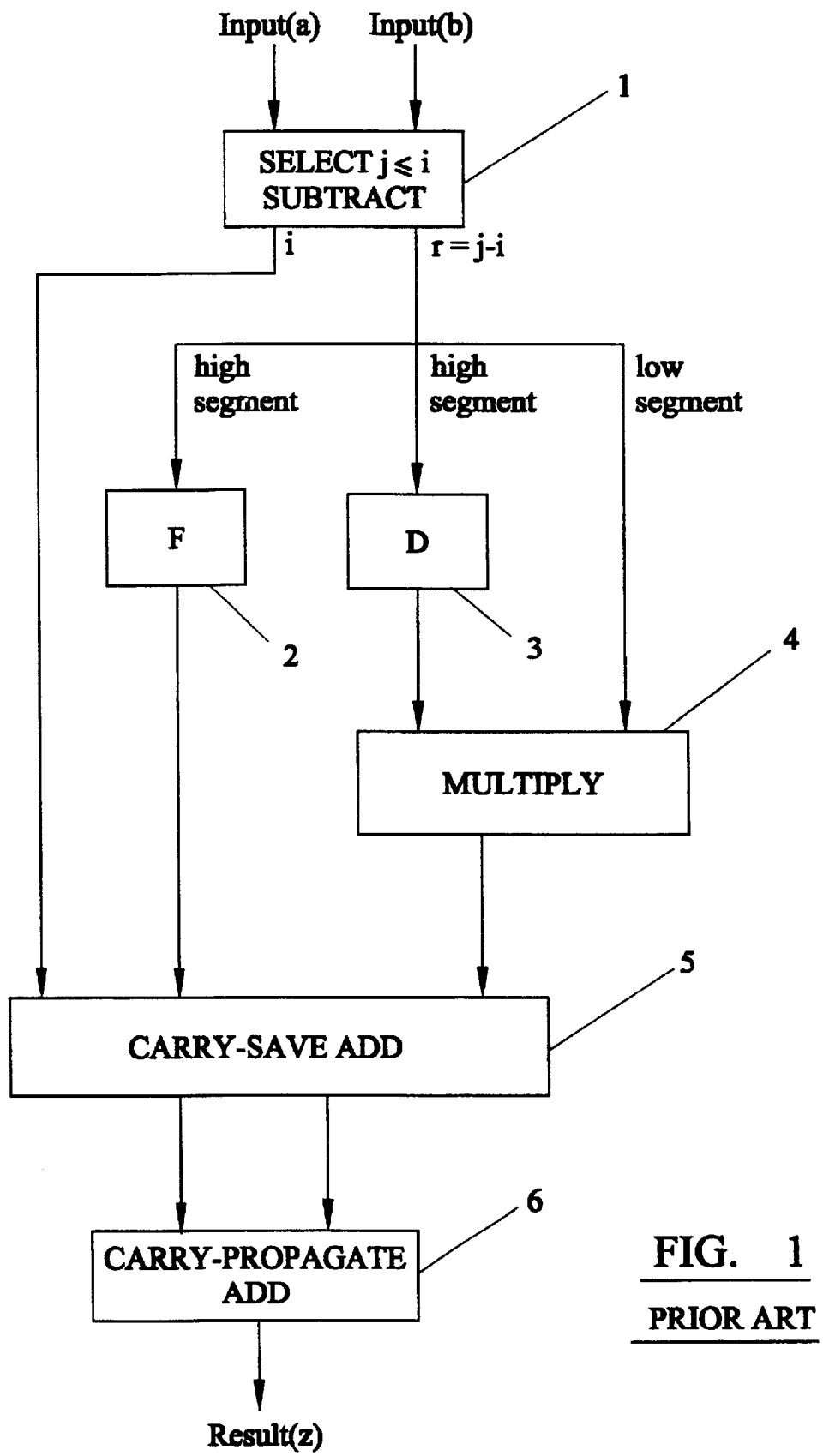
FIG. 1 is a schematic representation of a prior art Logarithmic Number System.
Figure 3:
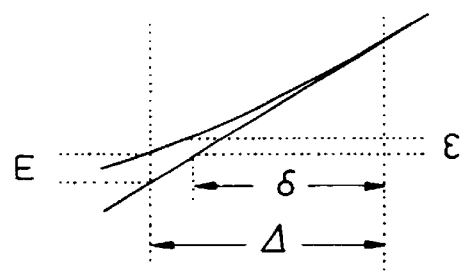
FIG. 3 is a diagram showing the relationship between the quantities $\epsilon$, $E(r)$, $\delta$ and $\Delta$.
Figure 2:
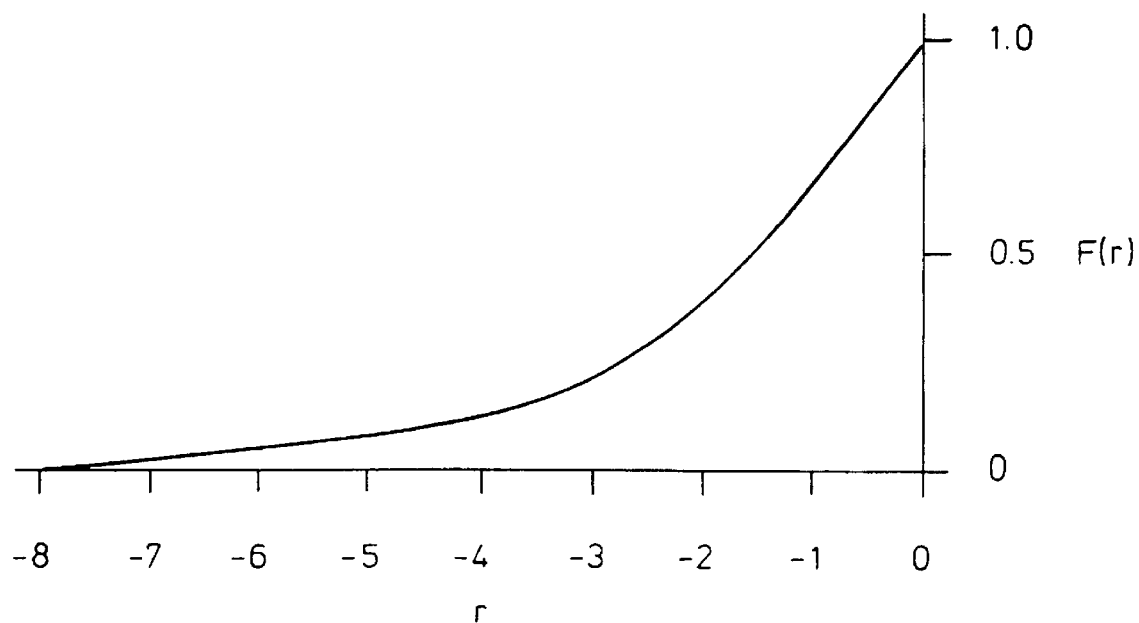
FIG. 2 is a graph showing the variation of the logarithmic function $F(r)=\log_2(1+2^{j-i})$, where $r=j-i$, with r.
Figure 4:
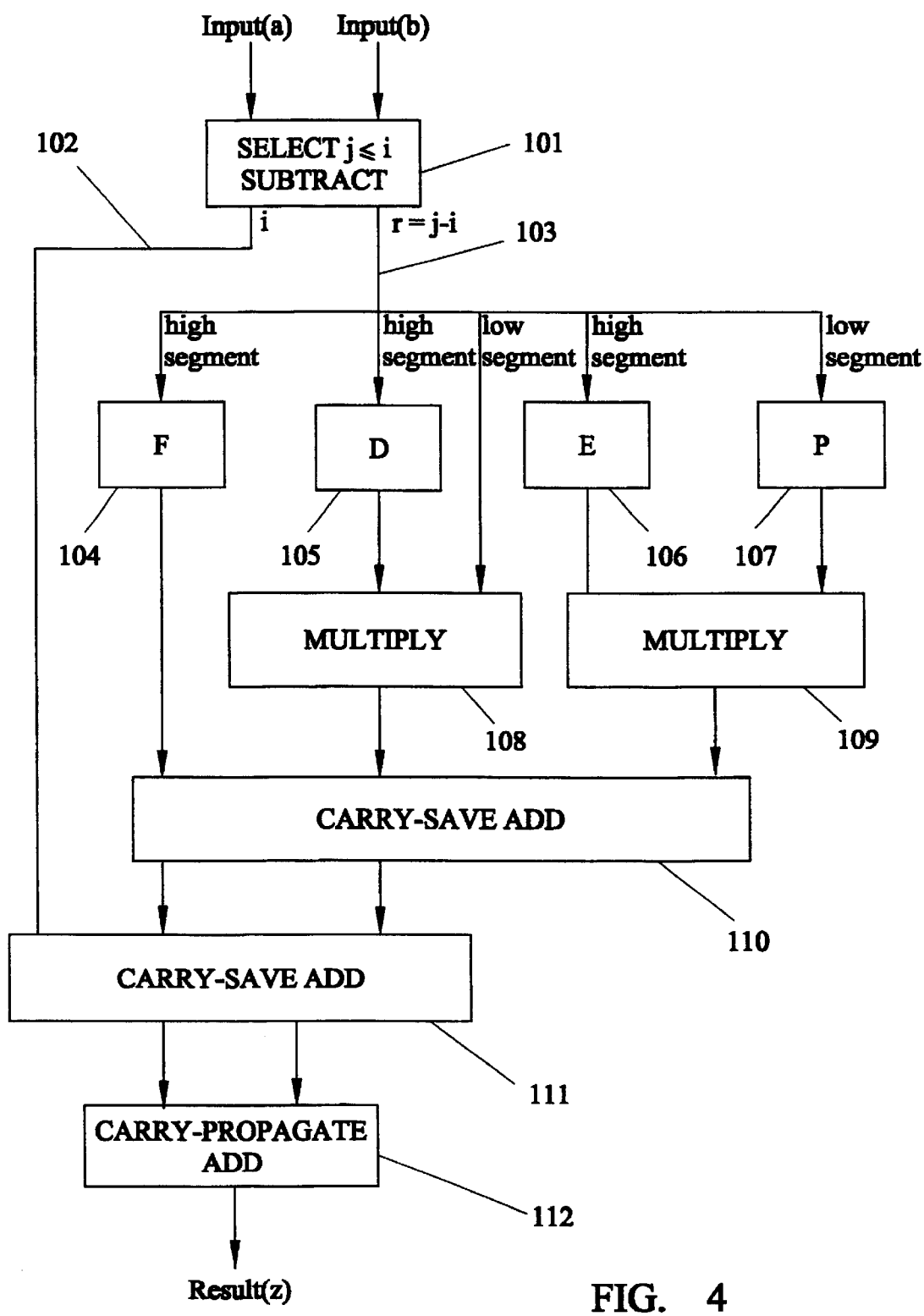
FIG. 4 is a schematic representation of an apparatus embodying the present invention.

Referring to FIG. 4, a logarithmic arithmetic apparatus embodied within a microprocessor has a selector/subtracter 101 having an output 102 representing i and an output 103 representing r=j−i. The output 103 of selector/subtracter 101 is input to a look up table 104 storing values of the function $F(r)$ at discrete values of r, a look up table 105 storing values of $D(r)$, the derivative or slope of $F(r)$ at discrete values of r, a look up table 106 storing values of $E(r)$, the difference between $[F(r)+\Delta.D(r)]$ and $F(r+\Delta)$ for each interval of width $\Delta$, and a look up table 107 for storing values of $P(\delta)$, the ratio of the difference between $F(r+\delta)$ and $[F(r)+\delta.D(r)]$ to $E(r)$ for a plurality of values of $\delta$.

The output 103 of selector/subtracter 101 is thus divided into a high order segment representing $n\Delta$ and a low order segment representing $\delta$, the high order segment being input to the look up tables 104, 105 and 106, and the low order segment being input to look up table 107. The low order segment is also input to a multiplier 108 together with the output of look up table 105 to produce an output representing the product of $\delta$ and the derivative $D(r)$. The outputs of look up tables 106 and 107 are input to a multiplier 109 which multiplies those quantities together to provide an output representing the error in the interpolated value of the function.

The outputs of look up table 104 and multipliers 108 and 109 are input to a carry-save-add stage 110, the two outputs of which are input to a further carry-save-add stage 111, to which the output 102 of selector/subtracter 101 is also input. The two outputs of carry-save-add stage 111 are then input to a carry-propagate-add stage 112, the output of which represents the value of the overall logarithmic function $i+\log_2(1+2^{j-i})$ to be calculated.

The operation of the apparatus shown in FIG. 4 will now be described.

The values j and i are input to the selector/subtracter 101, as a result of which the output 103 of subtracter 101 causes simultaneous access to look up tables 104, 105, 106 and 107. The multiplier 108 then determines the product $\delta.D(r)$, while the multiplier 109 operates simultaneously to determine the product $E(r).P(\delta)$. The outputs of look up table 104 and multipliers 108, 109 are then added in carry-save-add stage 110 to determine the value of the logarithmic function $F(r)$. The remaining part i of the quantity to be evaluated is added to the value of $F(r)$ in carry-save-add stage 111 and input to the carry-propagate-add stage 112, which outputs the result to be determined.

The carry-save-add stages 110 and 111 do not significantly decrease the speed of calculation by the device, and decrease in the speed of calculation is avoided by simultaneous operation of look up tables 104, 105, 106 and 107, and simultaneous operation of multipliers 108 and 109. In a practical embodiment, the P look up table 107 is not implemented for all possible values of $\delta$ but instead is implemented at intervals throughout its range. In one practical embodiment of the invention, based on a forty bit Logarithmic Number System using a 4096 word P look up table 107, application of the invention improves the worst case error from around five thousand times the least significant bit, to around four times the least significant bit. In this case, the look up table capacity occupied by the new E look up table 106 and P look up table 107 is approximately the same as that already occupied by the F look up table 104 and D look up table 105. Thus the total table capacity is no more than doubled. With appropriate rounding, this forty bit system can be used to perform the internal operations of a 32 bit system, and when used in this way, worst case accuracy approaching 0.5 of a least significant bit is achievable.

It will be appreciated by persons skilled in the art that the above embodiment has been described by way of example only, and not in any limitative sense, and that various alterations and modifications are possible without departure from the scope of the invention as defined by the appended claims. For example, the invention can be used to determine many types of logarithmic function (i.e. a function having a logarithmic term) and not just the specific addition example set out above. Also, the interval $\Delta$ can be of constant or variable width over the intervals for which values are stored, with appropriate treatment of the input address to the F, D, E and P look up tables. The method of the invention can also be used for the logarithmic subtraction function set out on page 1, with the possible exception of the range r=0 to r=−1. However, methods will be familiar to persons skilled in the art, for example J. N. Coleman "Simplification of Table Structure in Logarithmic Arithmetic", Electronics Letters, Vol. 31, 1995, pages 1905 to 1906, and the erratum Vol. 32, 1996, page 2103, the entire disclosures of which are incorporated herein by reference. By these methods, subtraction in this region may be avoided. It will also be appreciated by persons skilled in the art, as mentioned above, that the quantities E(x), P($\delta$), x and so on can be positive or negative as appropriate, and that adder stages may correspondingly be adder or subtracter as appropriate.

It will be further appreciated by persons skilled in the art that carry-propagate-add stages occurring within multipliers 108 and 109 could be replaced with additional carry-save-add stages between the output of the now reduced multipliers (previously indicated 108 and 109) and the final carry-propagate-add 112, to produce the same result. This is just one (non-limiting) example of what is meant by the phrase "or equivalent thereof" in relation to the first and/or second multiplier means of the invention specified herein.

What is claimed is:

1. A logarithmic calculating apparatus for determining the approximate value of a logarithmic function F(x) at a value of x of interest, the apparatus comprising:

first memory means for storing values of the function F(x) for a plurality of discrete values of x;

second memory means for storing values of F'(x), the slope of the function F(x), for said plurality of discrete values of x;

first multiplier means for multiplying the value of F'(x) for a said discrete value of x adjacent to the value of x of interest by $\delta$, the difference between said adjacent discrete value of x and the value of x of interest;

third memory means for storing values of E(x), the approximate difference between {F(x)+$\Delta$·F'(x)} and F(x+$\Delta$) where x and x+$\Delta$ are the adjacent pair of said discrete values of x nearest to the value of x of interest;

fourth memory means for storing values of P($\delta$), the ratio of (i) the difference between F(x+$\delta$) and {F(x)+$\delta$·F'(x)}, to (ii) E(x) for a plurality of values of $\delta$;

second multiplier means for multiplying together the outputs of said third and fourth memory means; and adder means for adding together the outputs of said first memory means, said first multiplier means and said second multiplier means to produce an output representing the approximate value of F(x) at the value of x of interest.

2. An apparatus according to claim 1, wherein said first and second multiplier means operate substantially simultaneously in use.

3. An apparatus according to claim 1, wherein the logarithmic function has the form $F(x)=\log_2(1+2^x)$.

4. An apparatus according to claim 1, wherein the adder means is a carry-save-add means cooperating with at least one carry-propagate add means.

5. An apparatus according to claim 1, wherein said first, second, third and fourth memory means are accessed substantially simultaneously in use.

6. An apparatus according to claim 1, wherein the logarithmic function has the form $F(x)=\log_2(1-2^x)$.

7. An apparatus according to claim 1, wherein the logarithmic function has the form $F(x)=\ln(1+e^x)$.

8. An apparatus according to claim 1, wherein the logarithmic function has the form $F(x)=\log_a(B+Ck^x)$, where a, B, C, and k are constants.

9. A microprocessor including a logarithmic calculating apparatus comprising:

first memory means for storing values of the function F(x) for a plurality of discrete values of x;

second memory means for storing values of F'(x), the slope of the function F(x), for said plurality of discrete values of x;

first multiplier means, for multiplying the value of F'(x) for a said discrete value of x adjacent to the value of x of interest by $\delta$, the difference between said adjacent discrete value of x and the value of x of interest;

third memory means for storing values of E(x), the approximate difference between {F(x)+$\Delta$·F'(x)} and F(x+$\Delta$) where x and x+$\Delta$ are the adjacent pair of said discrete values of x nearest to the value of x of interest;

fourth memory means for storing values of P($\delta$), the ratio of (i) the difference between F(x+$\delta$) and {F(x)+$\delta$·F'(x)}, to (ii) E(x) for a plurality of values of $\delta$;

second multiplier means, for multiplying together the outputs of said third and fourth memory means; and adder means for adding together the outputs of said first memory means, said first multiplier means and said second multiplier means to produce an output representing the approximate value of F(x) at the value of x of interest.

10. A method of determining the approximate value of a logarithmic function F(x) at a value of x of interest in a logarithmic calculating apparatus, the method comprising the steps of:

storing values of the function F(x) for a plurality of discrete values of x;

storing values of F'(x), the slope of the function F(x), for said plurality of discrete values of x;

multiplying the value of F'(x) for a said discrete value of x adjacent to the value of x of interest by $\delta$, the difference between said adjacent discrete value of x and the value of x of interest;

storing values of E(x), the approximate difference between {F(x)+$\Delta$·F'(x)} and F(x+$\Delta$) where x and x+$\Delta$ are the adjacent pair of said discrete values of x nearest to the value of x of interest;

storing values of P(δ), the ratio of (i) the difference between {F(x)+δ·F'(x)} and F(x+δ), to (ii) E(x) for a plurality of values of δ;

multiplying together the values of E(x) and P(δ) for the value of x of interest; and adding together said values of F(x), δ·F'(x) and E(x)·P(δ) to provide the approximate value of F(x) for the value of x of interest.

11. A method according to claim 10, wherein the logarithmic function has the form $F(x)=\log_2(1+2^x)$.

12. A method according to claim 10, wherein said multiplication steps are carried out substantially simultaneously.

13. A method according to claim 10, wherein said addition step is carried out by means of a carry-save add stage cooperating with a subsequent carry-propagate-add stage.

14. A method according to claim 10, wherein the stored values are accessed substantially simultaneously.

15. A method of evaluating a logarithmic function F(x) at a value of interest $x_{in}$, the method comprising the steps of:

selecting a known value $x_o$;

calculating a difference value δ between the value of interest $x_{in}$ and the known value $x_o$;

recalling a first stored value $F(x_o)$ representing the logarithmic function at the known value $x_o$;

recalling a second stored value $F'(x_o)$ representing the derivative of logarithmic function at the known value $x_o$;

recalling a third stored value $E(x_o)$ based on the known value $x_o$;

recalling a fourth stored value P(δ) based on the difference value δ;

calculating an output value $F(x_{in})$ based on the difference value and on the first, second, third, and fourth stored values according to the formula $$F(x_{in})=F(x_o)+\delta\cdot F'(x_o)+E(x_o)\cdot P(\delta);\text{ and}$$

storing the output value $F(x_{in})$ in a memory.

16. The method of claim 15, wherein the logarithmic function has the form $F(x)=\log_a(B+Ck^x)$, where a, B, C, and k are constants.

17. A computer-readable medium storing a computer-executable program code for evaluating a logarithmic function F(x) at a value of interest $x_{in}$, said computer-executable program code comprising:

code for selecting a known value $x_o$;

code for calculating a difference value δ between the value of interest $x_{in}$ and the known value $x_o$;

code for recalling a first stored value $F(x_o)$ representing the logarithmic function at the known value $x_o$;

code for recalling a second stored value $F'(x_o)$ representing the derivative of logarithmic function at the known value $x_o$;

code for recalling a third stored value $E(x_o)$ based on the known value $x_o$;

code for recalling a fourth stored value P(δ) based on the difference value δ;

code for calculating an output value $F(x_{in})$ based on the difference value and on the first, second, third, and fourth stored values according to the formula $$F(x_{in})=F(x_o)+\delta\cdot F'(x_o)+E(x_o)\cdot P(\delta);\text{ and}$$

code for storing the output value $F(x_{in})$ in a memory.

18. The computer-readable medium of claim 17, wherein the logarithmic function has the form $F(x)=\log_a(B+Ck^x)$, where a, B, C, and k are constants.

19. A method of adding two numbers, the method comprising the steps of:

calculating a value of interest $r_{in}=j-i$ in response to a first number X, with a first logarithm $i=\log_2(X)$, and in response to a second number Y, with a second logarithm $j=\log_2(Y)$;

selecting a known value $r_o$;

calculating a difference value δ between the value of interest $r_{in}$ and the known value $r_o$;

recalling a first stored value $F(r_o)$ representing the logarithmic function $F(r)=\log_2(1+2^r)$ at the known value $r_o$;

recalling a second stored value $F'(r_o)$ representing the derivative of logarithmic function F(r) at the known value $r_o$;

recalling a third stored value $E(r_o)$ based on the known value $r_o$;

recalling a fourth stored value P(δ) based on the difference value δ; and calculating an output value based on the first logarithm, the difference value, and the first, second, third, and fourth stored values according to the formula $$\log(X+Y)=i+F(r_o)+\delta\cdot F'(r_o)+E(r_o)\cdot P(\delta).$$

20. A method of subtracting two numbers, the method comprising the steps of:

calculating a value of interest $r_{in}=j-i$ in response to a first number X, with a first logarithm $i=\log_2(X)$, and in response to a second number Y, with a second logarithm $j=\log_2(Y)$;

selecting a known value $r_o$;

calculating a difference δ between the value of interest $r_{in}$ and the known value $r_o$;

recalling a first stored value $F(r_o)$ representing a logarithmic function $F(r)=\log_2(1-2^r)$ at the known value $r_o$;

recalling a second stored value $F'(r_o)$ representing a derivative of the logarithmic function F(r) at the known value $r_o$;

recalling a third stored value $E(r_o)$ based on the known value $r_o$;

recalling a fourth stored value P(δ) based on the difference δ; and calculating an output value based on the first logarithm, the difference value, and the first, second, third, and fourth stored values according to the formula $$\log(X+Y)=i+F(r_o)+\delta\cdot F'(r_o)+E(r_o)\cdot P(\delta).$$

* * * * *